(12) United States Patent
Matsushita

(10) Patent No.: US 8,079,282 B2
(45) Date of Patent: Dec. 20, 2011

(54) SWITCH DEVICE FOR TRANSMISSION AND TRANSMISSION USING SAME

(75) Inventor: Masahiro Matsushita, Okazaki (JP)

(73) Assignees: Mitsubishi Jidosha Kogyo Kabushiki Kaisha, Tokyo (JP); Mitsubishi Jidosha Engineering Kabushiki Kaisha, Okazaki-Shi (JP)

( * ) Notice: Subject to any disclaimer, the term of this patent is extended or adjusted under 35 U.S.C. 154(b) by 363 days.

(21) Appl. No.: 12/444,860

(22) PCT Filed: Feb. 18, 2008

(86) PCT No.: PCT/JP2008/052644
§ 371 (c)(1),
(2), (4) Date: Apr. 9, 2009

(87) PCT Pub. No.: WO2009/031328
PCT Pub. Date: Mar. 12, 2009

(65) Prior Publication Data
US 2010/0095794 A1    Apr. 22, 2010

(30) Foreign Application Priority Data
Sep. 5, 2007  (JP) .................................. 2007-230760

(51) Int. Cl.
*B60K 20/00* (2006.01)
*G05G 5/00* (2006.01)
(52) U.S. Cl. .................................. 74/473.23; 74/473.21
(58) Field of Classification Search .................. 74/473.1, 74/473.12, 473.15, 473.21, 473.23; 200/61.88
See application file for complete search history.

(56) References Cited

U.S. PATENT DOCUMENTS

| | | | | |
|---|---|---|---|---|
| 4,723,642 | A | * | 2/1988 | Grunberg et al. ............ 192/3.55 |
| 5,029,683 | A | | 7/1991 | Grunberg et al. |
| 2004/0060806 | A1 | | 4/2004 | Nakazawa et al. |
| 2006/0081085 | A1 | * | 4/2006 | Otsuka et al. .............. 74/473.21 |
| 2006/0094565 | A1 | * | 5/2006 | Sato et al. ....................... 477/99 |

FOREIGN PATENT DOCUMENTS

| | | |
|---|---|---|
| GB | 2 302 146 A | 1/1997 |
| JP | 2-248758 A | 10/1990 |
| JP | 2004-116702 A | 4/2004 |
| JP | 2004-360892 A | 12/2004 |
| JP | 2005-344805 A | 12/2005 |

OTHER PUBLICATIONS

Extended European Search Report dated Apr. 29, 2011.

* cited by examiner

*Primary Examiner* — Justin Krause
(74) *Attorney, Agent, or Firm* — Birch, Stewart, Kolasch & Birch, LLP

(57) ABSTRACT

To provide a dual-system switch device for a transmission, using conventional components, without newly preparing a new dual-system switch device, a switch device 1 for a transmission comprises: a main inhibitor switch 11 which is connected to a shift cable 32 moving in accordance with the select position of a shift lever 3 operated by a driver, and which detects the select position of the shift lever in accordance with the movement of the shift cable 32; and a sub-inhibitor switch 13 which is connected to the shift cable 32 via a connecting member, and which detects the select position of the shift lever in accordance with the movement of the shift cable.

8 Claims, 3 Drawing Sheets

SWITCH DEVICE FOR TRANSMISSION AND TRANSMISSION USING SAME

BACKGROUND OF THE INVENTION

1. Field of the Invention

This invention relates to a switch device for a transmission, and a transmission using the switch device.

2. Description of the Related Art

To ensure the safety of vehicular travel, a signal system of a transmission has so far used a transmission abnormality detecting device which detects the abnormality of the signal system based on whether the same signal is sent by two detecting means of an electric system and a mechanical system. Various switches such as a mechanical hydraulic switch and an electrical inhibitor switch are used as the detecting means of the abnormality detecting device.

As the abnormality detecting device provided with such two switches, namely, a so-called dual-system switch device, the following device, for example, is known: This is a failure detecting device for an automatic transmission which switches shift by engaging and releasing a plurality of friction elements. The failure detecting device is equipped with a selector detecting means (inhibitor switch) for detecting a driving range selected by a driver's operation of a shift selector; and a hydraulic pressure detecting means (hydraulic switch) for detecting a hydraulic pressure exerted on the friction element and sending a hydraulic pressure detection signal. Configured in this manner, this failure detecting device detects a range detection failure based on inconsistency between the driving range indicated by a selector detection signal and the driving range indicated by the hydraulic pressure detection signal upon detection of the hydraulic pressure exerted on the friction element (for example, Patent Document 1).

Patent Document 1: JP-A-2005-344805 (see claim 1)

SUMMARY OF THE INVENTION

Problems to be Solved by the Invention

Such a dual-system switch device exercises control by two systems composed of a mechanical system and an electric system, so that control over a transmission is complicated. In recent years, a dual-system switch device composed of an electric system only has been demanded in order to simplify this control.

However, an attempt to prepare anew an electric-system switch other than an inhibitor switch for an interlock with the inhibitor switch, thereby producing a novel dual-system switch device, poses the problems of leading to an increased cost and requiring a wide installation space.

Under these circumstances, the present invention is directed toward solving the problems of conventional technologies. It is an object of the invention to provide a dual-system switch device for a transmission, the device being composed of conventional components, without the need to newly prepare an electric-system switch for the switch device, and resulting in saving space. It is another object of the invention to provide a transmission furnished with the dual-system switch device for a transmission.

Means for Solving the Problems

The switch device of the present invention comprises: a main inhibitor switch which is connected to a shift cable moving in accordance with a select position of a shift lever operated by a driver, and which detects the select position of the shift lever in accordance with a movement of the shift cable; and a sub-inhibitor switch which is connected to the shift cable via a connecting member, and which detects the select position of the shift lever in accordance with the movement of the shift cable.

In the present invention, two ordinary inhibitor switches, i.e., the main inhibitor switch and the sub-inhibitor switch, are connected to the shift lever directly or via the connecting member, and each inhibitor switch can detect the select position. Thus, a dual-system switch device composed of only an electric system can be constituted, without the need to prepare a new electric-system switch.

Preferably, the main inhibitor switch comprises a main lever having a first rotating shaft fixed to a site near a center in a longitudinal direction of the main lever, and a main switch portion connected to the first rotating shaft, and detecting the select position of the shift lever based on a rotating position of the first rotating shaft rotating according to a rotation of the main lever, and the sub-inhibitor switch comprises a sub-lever fixed to a second rotating shaft provided at one end of the sub-lever, and a sub-switch portion connected to the second rotating shaft, and detecting the select position of the shift lever based on a rotating position of the second rotating shaft rotating according to a rotation of the sub-lever, the shift cable is connected to one end of the main lever, one end of a rod is connected to an opposite end of the main lever, with the first rotating shaft being interposed between the one end and the opposite end of the main lever, and an opposite end of the sub-lever is connected to an opposite end of the rod, the main lever rotates together with the first rotating shaft as the shift cable moves, and the select position is detected by the main switch portion in accordance with the rotating position of the first rotating shaft, the sub-lever rotates in an interlocked relationship with the rod moved by the rotation of the main lever, the second rotating shaft rotates in a direction identical with a direction of the first rotating shaft according to the rotation of the sub-lever, and the select position is detected by the sub-switch portion in accordance with the rotating position of the second rotating shaft. Configured in this manner, the switch device for a transmission is compact. Furthermore, the second rotating shaft of the sub-inhibitor switch rotates simultaneously with the rotation of the first rotating shaft of the main inhibitor switch. Thus, no time difference occurs between the two switches, and the signal indicating the select position can be detected at the same time.

Preferably, the second rotating shaft rotates at an angle identical with an angle of the first rotating shaft according to the rotation of the sub-lever. Because of this feature, the same inhibitor switch can be used for each of the main inhibitor switch and the sub-inhibitor switch, thus making the common use of components possible.

The transmission of the present invention is characterized by having a transmission case equipped with the above-described switch device for a transmission, and having an output portion of the main inhibitor switch and an output portion of the sub-inhibitor switch connected to a transmission control section. The transmission of the present invention is constructed compactly as a whole, because the switch device configured compactly as mentioned above is provided in the transmission case.

Effects of the Invention

According to the switch device of the present invention, the dual-system switch device composed of an electrical system alone can be obtained by disposing the inhibitor switches, which are conventional products, without the need for preparing a new switch. Thus, the cost is low. Moreover, both switches can simultaneously detect the signal indicating the select position. Hence, there can be obtained the excellent effects that the select position can be detected more accurately, and high safety can be ensured.

Since the transmission of the present invention has the above switch device, it exhibits the excellent effects that the cost is low, and the select position can be detected at the same time. Moreover, the transmission is configured such that the switch device can be installed on the transmission case. Thus, the transmission also shows the excellent effect that the transmission as a whole is compact.

DESCRIPTION OF THE NUMERALS

Figure 1:
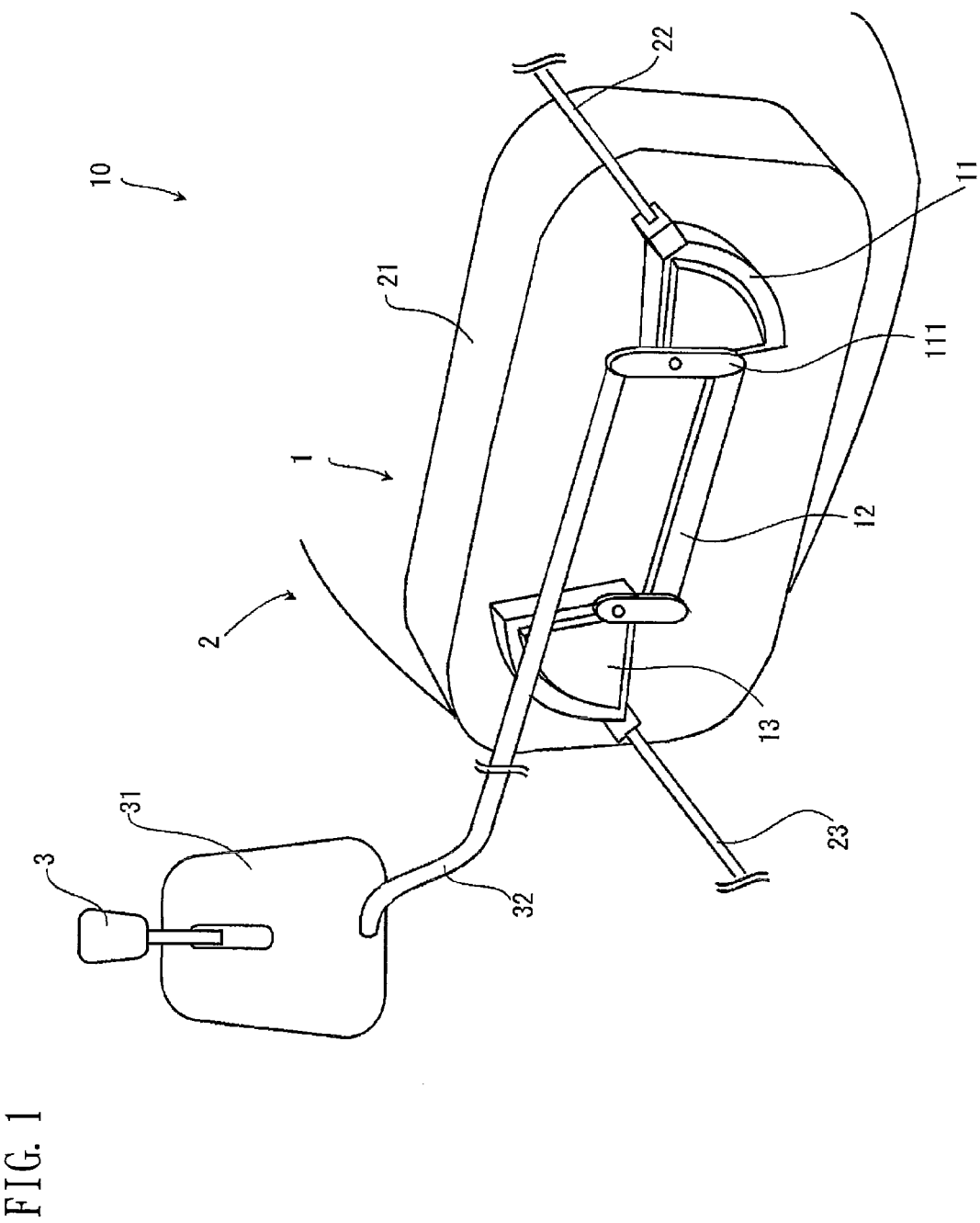
FIG. 1 is a general schematic view of a transmission device according to the present invention.

1 Switch device
2 Transmission
3 Shift lever
10 Transmission device
11 Main inhibitor switch
12 Rod
13 Sub-inhibitor switch
21 Transmission case
22 Main switch cable
23 Sub-switch cable
31 Case
32 Shift cable
33 Support portion
111 Main lever
112 Main switch portion
113 Main rotating shaft
114 Terminal
131 Sub-lever
132 Sub-switch portion
133 Sub-rotating shaft
134 Terminal

DETAILED DESCRIPTION OF THE INVENTION

Figure 2:
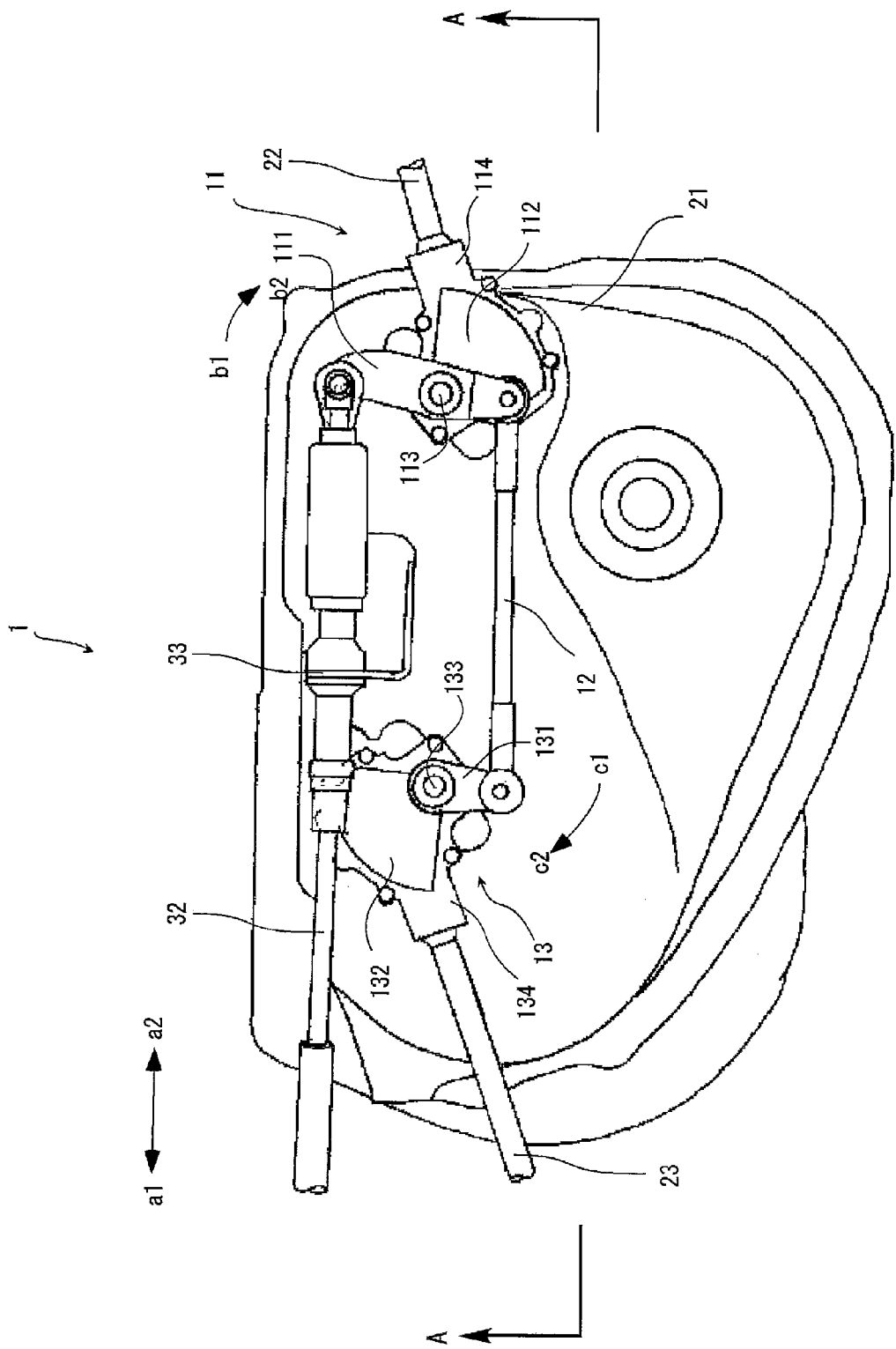
FIG. 2 is a side view of the transmission device equipped with a switch device according to the present invention.
Figure 3:
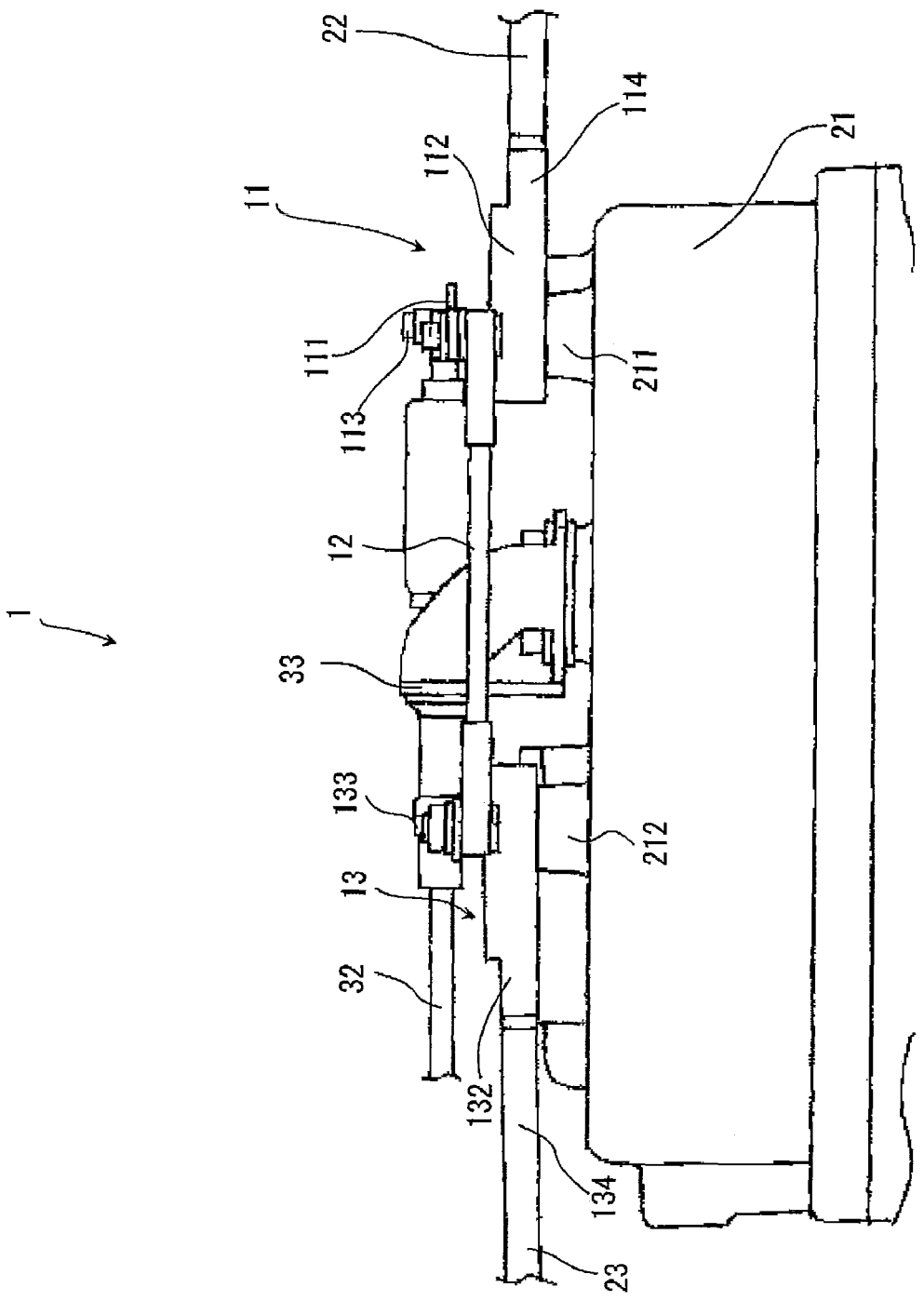
FIG. 3 is a view taken along line A-A in FIG. 2.

A switch device for a transmission (will also be referred to hereinafter as a switch device) according to the present invention, and a transmission using this switch device will be described using FIGS. 1 to 3. FIG. 1 is a general schematic view of a transmission intended to explain a transmission device 10 of the present invention to which a dual-system switch device 1 of the present invention has been applied. FIG. 2 is a side view of the transmission device 10 equipped with the switch device 1 of the present invention. FIG. 3 is a view taken along line A-A in FIG. 2.

According to FIG. 1, the transmission device 10 of the present invention comprises the switch device 1 and a transmission 2. The switch device 1 is installed on the side surface of a transmission case 21 of the transmission 2. A shift lever 3 operated by a driver is connected to a shift cable 32 within a case 31 provided laterally of a driver's seat. The shift cable 32 moves in a reciprocating manner in one direction according to the select position of the shift lever 3.

The switch device 1 is equipped with a main inhibitor switch 11 connected to the shift cable 32, and a sub-inhibitor switch 13 connected to the shift cable 32 via a main lever 111 and a rod 12 to be described later.

That is, the switch device 1 is a dual-system switch device comprising an electric system composed of the two inhibitor switches (the main inhibitor switch 11 and the sub-inhibitor switch 13) which are used generally. Thus, the switch device 1 of the present invention can realize a low cost without the need to prepare a new switch. Moreover, the switch device 1 is arranged compactly in a simple configuration so that it can be installed on the side surface of the transmission case 21. Thus, the transmission 2 itself is also configured to be compact.

Relevant motions will be described briefly. The main inhibitor switch 11 detects the select position of the shift lever 3 in accordance with the movement of the shift cable 32 connected to the main inhibitor switch. On the other hand, the sub-inhibitor switch 13 is connected to the shift cable 32 via the main lever 111 and the rod 12 as connecting members. Thus, the sub-inhibitor switch 13 detects the select position of the shift lever 3 in accordance with the movement of the connecting members associated with the movement of the shift cable 32.

Furthermore, a main switch cable 22 is connected to the main inhibitor switch 11, while a sub-switch cable 23 is connected to the sub-inhibitor switch 13, and these cables are connected to a shift control section (not shown) of the transmission 2. Because of this constitution, a signal indicating the select position detected by the main inhibitor switch 11 and the sub-inhibitor switch 13 is transmitted to the shift control section of the transmission via these cables, and the transmission achieves a desired shift stage.

In the switch device 1 of the present invention, as described above, each inhibitor switch is connected to the shift cable 32 directly or via the connecting members. As a result, each inhibitor switch can detect the signal indicating the select position in accordance with the movement of the shift cable 32. Thus, the switch device 1 of the present invention serves as the dual-system switch device which can detect the signal indicating the select position by the two lines comprising ordinary electric-system switches.

The configuration of the dual-system switch device 1 of the present invention will be described in detail below.

According to FIGS. 2 and 3, the main inhibitor switch 11 comprises the main lever 111, and a main switch portion 112 fixed to the transmission case 21 via a mounting portion 211. A main rotating shaft 113 is fixed to a site near the center in the longitudinal direction of the main lever 111, and the main rotating shaft 113 is connected rotatably to the main switch portion 112. The shift cable 32 supported by a support portion 33 is fixed to one end of the main lever 111. That is, the main lever 111 is adapted to rotate together with the main rotating shaft 113, with the main rotating shaft 113 as the axis center, in interlocking relationship with the movement of the shift cable 32.

On the other hand, one end of the rod 12 is fixed to the other end of the main lever 111, with the main rotating shaft 113 being interposed between the one end and the other end of the main lever 111. The rod 12 faces the shift cable 32, and is disposed nearly parallel to the shift cable 32. That is, the rod 12 is connected to the shift cable 32 via the main lever 111, whereby the rod 12 is adapted to move in a direction opposite to the shift cable 32 in interlocking relationship with the shift cable 32 and the main lever 111.

The sub-inhibitor switch 13 is fixed to the other end of the rod 12. The sub-inhibitor switch 13 comprises a sub-lever 131, and a sub-switch portion 132 fixed to the transmission case 21 via a mounting portion 212. The rod 12, which moves in the direction opposite to the shift cable 32 in interlocking relationship with the main lever 111, is connected to one end of the sub-lever 131. A sub-rotating shaft 133 is fixed to the other end of the sub-lever 131, and the sub-rotating shaft 133 is rotatably connected to the sub-switch portion 132. That is, the sub-lever 131 is adapted to rotate around the sub-rotating shaft 133 together with the sub-rotating shaft 133, in the same direction as the rotating direction of the main lever 111 at nearly the same angle as the angle of rotation of the main lever 111, in interlocking relationship with the rod 12.

That is, with the dual-system switch device 1 of the present invention, as the shift cable 32 moves, the main lever 111 and the sub-lever 131 both rotate in the same direction at nearly the same angle, so that the main rotating shaft 113 provided on the main switch portion 112 and the sub-rotating shaft 133 provided on the sub-switch portion 132 rotate in the same direction at nearly the same angle. Because of such features, the same inhibitor switch can be used for each of the main inhibitor switch 11 and the sub-inhibitor switch 13, thus making the common use of components possible.

The actions of the dual-system switch device 1 of the present invention will be described in detail below.

For example, when the shift lever 3 is operated to be brought from a position P to a position D, the shift cable 32 moves, for example, in a direction from a1 to a2, by a predetermined distance in response to this operation. As a result, the main lever 111 connected to the shift cable 32 rotates together with the main rotating shaft 113, in a direction from b1 to b2 through a predetermined angle, with the main rotating shaft 113 as the axis center. In accordance with the rotation of the main rotating shaft 113 fixed to the main lever 111, the connecting position of the connecting point of the main switch portion 112 connected to the main rotating shaft 113 is switched. That is, connection is switched from the connecting point where a signal indicating the state in which the select position is the position P is outputted to the transmission side, to the connecting point where a signal indicating the state in which the select position is the position D is outputted. Thus, the signal indicating the state where the select position is the position D is detected by the main inhibitor switch 11. The detected signal is transmitted from a terminal 114, which is provided in the main switch portion 112, into the transmission control section via the main switch cable 22.

On the other hand, in accordance with the rotation of the main lever 111, the rod 12 connected to the other end of the main lever 111 moves by a predetermined distance in opposition to the moving direction of the shift lever, namely, in a direction from a2 to a1. In accordance with this movement, the sub-lever 131 rotates in a direction from c1 to c2 together with the sub-rotating shaft 133, with the sub-rotating shaft 133 as the axis center. This rotation of the sub-rotating shaft 133 is accompanied by the switching of the connecting position of the contact point within the sub-switch portion 132. That is, connection is switched from the contact point where the signal indicating the state in which the select position is the position P is outputted to the transmission side, to the contact point where the signal indicating the state in which the select position is the position D is outputted. Thus, the signal indicating the state where the select position is the position D is detected by the sub-inhibitor switch 13. The detected signal is transmitted from a terminal 134, which is provided in the sub-switch portion 132, into the transmission control section via the sub-switch cable 23.

In this case, when the two inhibitor switches detect the same signal, i.e., the signal indicating the same select position, it is determined that the inhibitor switches are acting normally. Based on this determination, the desired shift stage is achieved in the transmission. Should either of the inhibitors fail, different signals are detected by the respective switches. Thus, the transmission control section detects that there is an abnormality in the switch system. Thus, a warning is issued to the driver, for example.

In the switch device 1 of the present invention, the main rotating shaft 113 and the sub-rotating shaft 133 are adapted to rotate in the same direction in a manner interlocked with the movement of the shift cable 32. Thus, the respective inhibitor switches can simultaneously detect the signal indicating the same select position. As seen here, the present switch device 1 is the dual-system switch device comprising an electrical system which can accurately detect the signal indicating the select position. This dual-system switch device is prepared from the two inhibitor switches, without the need for newly preparing an electrical-system switch. According to the present switch device 1, therefore, cost reduction can be achieved, and a high degree of safety can be ensured.

In addition, the inhibitor switches are provided in proximity to each other to constitute the switch device 1. Thus, the switch device 1 is compact, and minimally involves a discrepancy in the evaluation of the signal due to the tolerance or elongation of the cable, in comparison with a case where the respective switches are installed differently, on the shift cable side and on the transmission side. Hence, the signal indicating the select position can be detected more accurately, and high safety can be ensured.

In the switch device 1, moreover, each inhibitor switch is arranged compactly. Thus, a space saving can be achieved. Besides, the switch device 1 can be mounted not on the transmission case 21, but within the case 31 or on a part of the shift cable 32.

In the present embodiment, the shift cable 32 and the rod 12 are disposed nearly parallel, and the main rotating shaft 113 and the sub-rotating shaft 133 rotate in the same direction at nearly the same angle in a manner interlocked with the movement of the shift cable 32. Depending on the layout of the place of mounting of the switch device 1, however, the shift cable 32 and the rod 12 need not be nearly parallel. Nor do the main rotating shaft 113 and the sub-rotating shaft 133 need to rotate at nearly the same angle in a manner interlocked with the movement of the shift cable 32, if the same shift position can be detected by each inhibitor switch.

If the switch device 1 is mounted on the transmission case 21, the switch device 1 should desirably be mounted on an upper part of the transmission case 21 in order that water or the like splashed up from the road surface will be prevented from touching the switch device 1.

INDUSTRIAL APPLICABILITY

The switch device of the present invention can be used as a dual-system switch device for an automobile, etc. A transmission using the switch device of the present invention can be used as a transmission of a car with an automatic transmission. Thus, the present invention can be utilized in the field of the automobile industry.

The invention claimed is:
1. A switch device for a transmission, comprising:
a main inhibitor switch which is connected to a shift cable moving in accordance with a select position of a shift lever operated by a driver, and which detects the select position of the shift lever in accordance with a movement of the shift cable; and a sub-inhibitor switch which is connected to the shift cable via a main lever and a rod, and which detects the select position of the shift lever in accordance with the movement of the shift cable, wherein the main inhibitor switch comprises the main lever having a first rotating shaft fixed to a site near a center in a longitudinal direction of the main lever, and a main switch portion connected to the first rotating shaft, and detecting the select position of the shift lever based on a rotating position of the first rotating shaft rotating according to a rotation of the main lever, and the sub-inhibitor switch comprises, a sub-lever fixed to a second rotating shaft provided at one end of the sub-lever, and a sub-switch portion connected to the second rotating shaft, and detecting the select position of the shift lever based on a rotating position of the second rotating shaft rotating according to a rotation of the sub-lever, the shift cable is connected to one end of the main lever, one end of a rod is connected to an opposite end of the main lever, with the first rotating shaft being interposed between the one end and the opposite end of the main lever, and an opposite end of the sub-lever is connected to an opposite end of the rod, the main lever rotates together with the first rotating shaft as the shift cable moves, and the select position is detected by the main switch portion in accordance with the rotating position of the first rotating shaft, the sub-lever rotates in an interlocked relationship with the rod moved by the rotation of the main lever, the second rotating shaft rotates in a direction identical with a direction of the first rotating shaft according to the rotation of the sub-lever, and the select position is detected by the sub-switch portion in accordance with the rotating position of the second rotating shaft.

2. The switch device for a transmission according to claim claim 1, wherein the second rotating shaft rotates at an angle identical with an angle of the first rotating shaft according to the rotation of the sub-lever.

3. A transmission, comprising: having the transmission case equipped with the switch device for a transmission according to claim 2, and a transmission control section connected to an output portion of the main inhibitor switch and an output portion of the sub-inhibitor switch.

4. A transmission, comprising:

a transmission case equipped with the switch device for a transmission according to claim 1, and a transmission control section connected to an output portion of the main inhibitor switch and an output portion of the sub-inhibitor switch.

5. The switch device for a transmission according to claim 1, wherein the main inhibitor switch and the sub-inhibitor switch are provided on a transmission case.

6. A transmission comprising:

the transmission case equipped with the switch device for a transmission according to claim 5; and a transmission control section connected to an output portion of the main inhibitor switch and an output portion of the sub-inhibitor switch.

7. The switch device for a transmission according to claim 1, wherein the rod is adapted to move in a direction opposite to the shift cable in interlocking relationship with the shift cable and the main lever.

8. A transmission comprising:

a transmission case equipped with the switch device for a transmission according to claim 7, and a transmission control section connected to an output portion of the main inhibitor switch and an output portion of the sub-inhibitor switch.

* * * * *